United States Patent [19]
Aikens et al.

[11] Patent Number: 5,414,494
[45] Date of Patent: May 9, 1995

[54] AUTOMATIC CALL TO SELECTED REMOTE OPERATORS IN RESPONSE TO PREDETERMINED MACHINE CONDITIONS

[75] Inventors: Andrew J. Aikens, Webster; Fritz F. Ebner, Rochester; Ronald F. Chapuran, Pittsford, all of N.Y.

[73] Assignee: Xerox Corporation, Stamford, Conn.

[21] Appl. No.: 161,612

[22] Filed: Dec. 6, 1993

[51] Int. Cl.⁶ .......................................... G03G 21/00
[52] U.S. Cl. ................................ 355/202; 355/200; 355/206; 355/208
[58] Field of Search ............. 355/200, 202, 203, 204, 355/205, 206, 207, 208, 209, 77; 358/406; 371/15.1, 16.4; 395/575, 500

[56] References Cited

U.S. PATENT DOCUMENTS

| | | | |
|---|---|---|---|
| 4,583,834 | 4/1986 | Seko et al. | 355/206 |
| 5,057,866 | 10/1991 | Hill, Jr. et al. | 355/200 |
| 5,077,582 | 12/1991 | Kravette et al. | 355/206 |
| 5,214,772 | 5/1993 | Weinberger et al. | 355/202 |
| 5,216,461 | 6/1993 | Maekawa et al. | 355/202 |
| 5,220,380 | 6/1993 | Hirata et al. | 355/204 |
| 5,303,005 | 4/1994 | Takano et al. | 355/202 |
| 5,305,055 | 4/1994 | Ebner et al. | 355/200 |
| 5,325,156 | 6/1994 | Ulinski | 355/209 |

*Primary Examiner*—A. T. Grimley
*Assistant Examiner*—Sandra L. Brase

[57] ABSTRACT

A method of automatic notification to selected remote devices in response to machine conditions detected by a machine monitoring element including displaying machine condition options for selection of predetermined machine conditions for automatic notification to remote stations, selectively programming the predetermined machine conditions for notification to the remote locations, monitoring the operation of the machine, determining a machine condition to be a condition to require a notification to the remote locations, and automatically initiating a notification to the remote locations on a priority basis including notification to a first remote station in response to a first machine condition and notification to a second remote station in response to a second machine condition detected by the machine monitoring element.

23 Claims, 15 Drawing Sheets

AUTOMATIC CALL TO SELECTED REMOTE OPERATORS IN RESPONSE TO PREDETERMINED MACHINE CONDITIONS

BACKGROUND OF THE INVENTION

The invention relates to calling a remote station or operator and more particularly, to the automatic notification to selected remote stations or operators in response to a priority of predetermined machine malfunctions or conditions.

It is important in the operation of complex electronic equipment, such as reproduction machines, to maintain the efficiency and productivity of the machine. Machine downtime due to various conditions such as paper jams, the need to reload paper trays, and undesirable quality due to factors such as low toner severely impact machine productivity. In addition, locations with multiple machine operations are often without an immediately available operator or trouble shooter. An assigned expediter may be at the location of machine when another machine needs immediate attention to continue operation. It is important for efficiency to reduce machine down time and to improve the efficiency of operator time spent in monitoring and correcting the machine operation at a specific location.

In the prior art, U.S. Pat. No. 4,922,294 to Nakagami et al. discloses an image forming apparatus equipped with a sensor for detecting the requirement of replenishment and exchange of expendable supplies, parts and the like. The apparatus forms a pre-warning image (33) which is distinguishable from a regular image (35) on the same sheet on which a regular image is formed corresponding to an original (21) or other image data so that operators can easily recognize whether a pre-warning image is on the sheet or not while confirming the regular image. The pre-warning image is formed on a sheet whether it is a roll sheet or cut sheet whenever manual handling is necessary. See Col 1, lines 60–69, Col. 2, lines 1–5.

U.S. Pat. No. 4,224,613 to Kaiser et al. discloses a warning system for printing presses. The system provides a warning system for a printing press which sounds an acoustic warning when any one of a given set of running conditions is exceeded or departed from. See Col. 1, lines 38–41.

U.S. Pat. No. 3, 3,842,408 to Wells discloses a system for providing an indication of a remote condition or problem within a machine. A transmitter coupled to the machine operates to separately sense different conditions of the machine and transmits separate signals corresponding to the sensed condition of the machine. The signals are carried via the conventional electric power distributing lines to a receiver and indicator apparatus. The indicator apparatus functions to selectively sense the signals from the receiver to provide a visual indication of the sensed condition of the machine.

A difficulty with prior art systems is that video or audio alarm systems are often limited in the range of notification and the inability to directly alert an operator who may be at one of several locations. In addition, once alerted, the operator often has little or no information on the nature of the alert or the condition of the machine needing attention.

It would be desirable, therefore, to minimize machine downtime and provide the capability of rapid operator response to machine requirements and for the operator to be able to pre-select the machine conditions requiring notice. It would also be desirable to be able to immediately alert an operator at a remote location for fast response and to be able to identify for the operator the status or condition of the machine that provided the notification.

It is an object of the present invention, therefore, to provide a new and improved technique for notification of an operator remote from a machine of the need for machine assistance. It is still another object of the present invention to notify a remote operator the type of assistance required to maintain machine productivity. It is still another object of the present invention to allow the pre-setting of a priority of conditions demanding automatic calling to a remote operator or station. Another advantage is to be able to automatically or remotely change the condition for notification. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is a method of automatic notification to selected remote devices in response to machine conditions detected by a machine monitoring element including displaying machine condition options for selection of predetermined machine conditions for automatic notification to remote stations, selectively programming the predetermined machine conditions for notification to the remote locations, monitoring the operation of the machine, determining a machine condition to be a condition to require a notification to a given remote location, and automatically initiating notification to remote locations on a priority basis including notification to a first remote station in response to a first machine condition and notification to a second remote station in response to a second machine condition detected by the machine monitoring element.

For a better understanding of the present invention, reference may be had to the accompanying drawings wherein the same reference numerals have been applied to like parts and wherein:

DETAILED DESCRIPTION OF THE DRAWINGS

Figure 7:
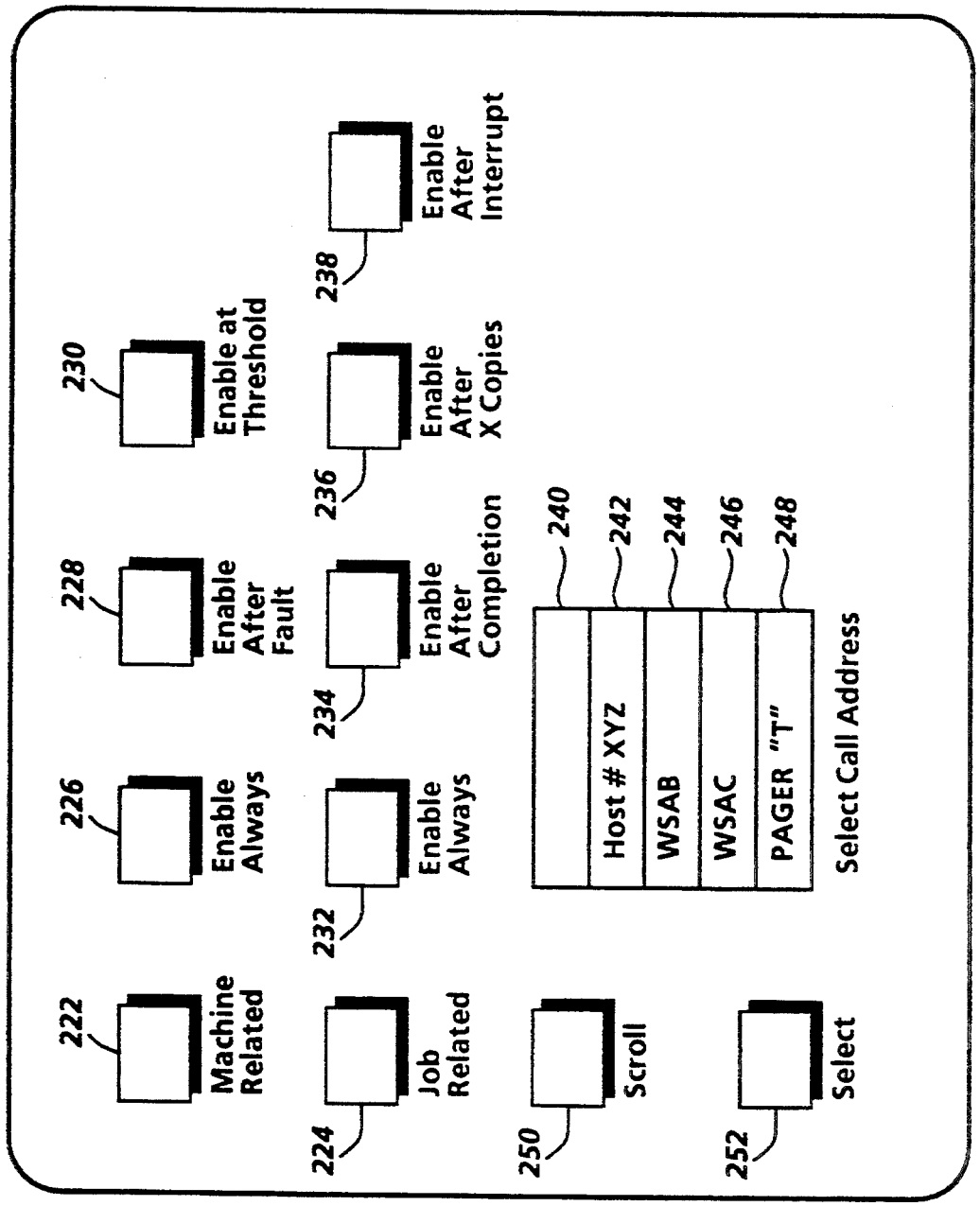
Figure 8:
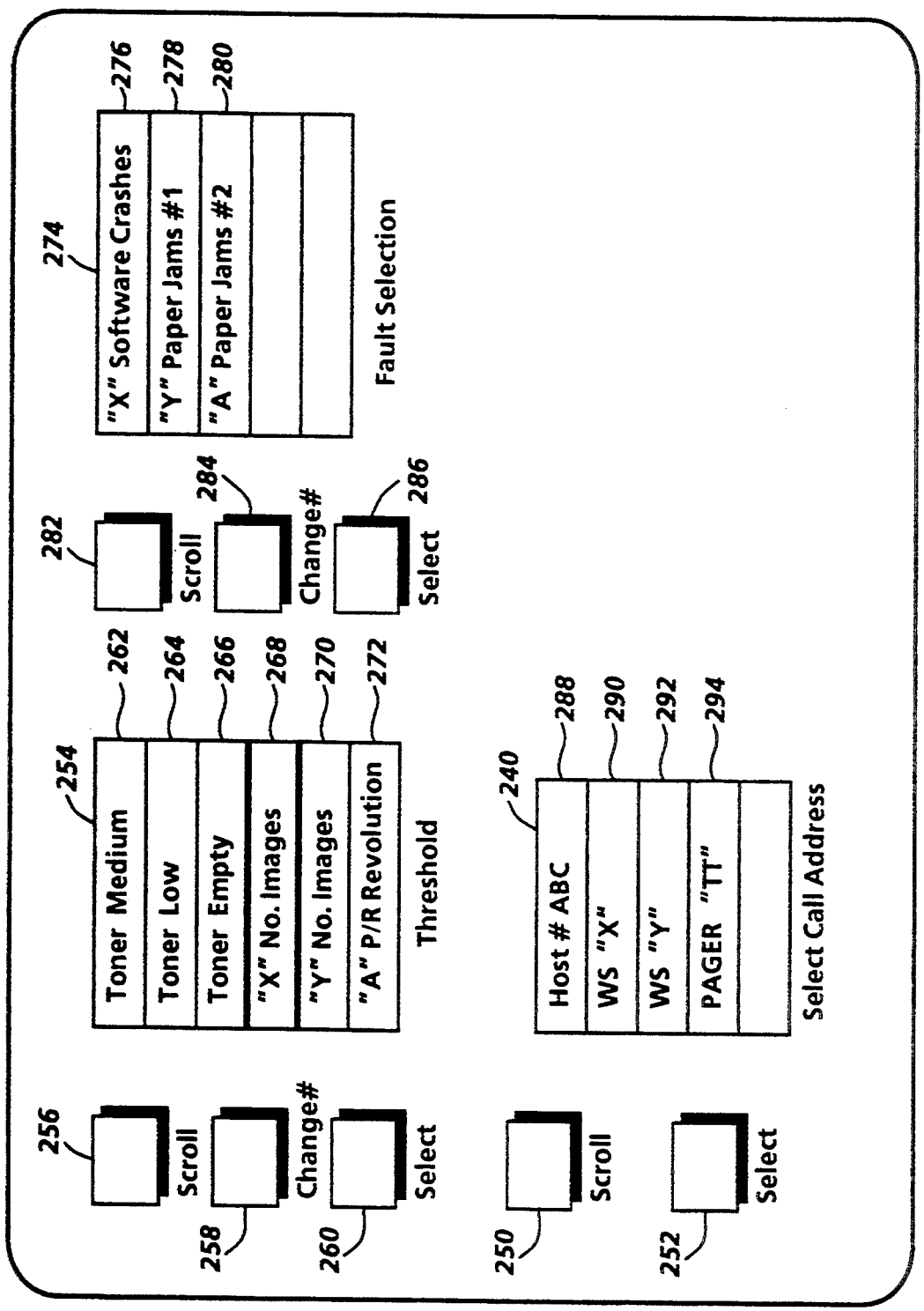
Figure 9:
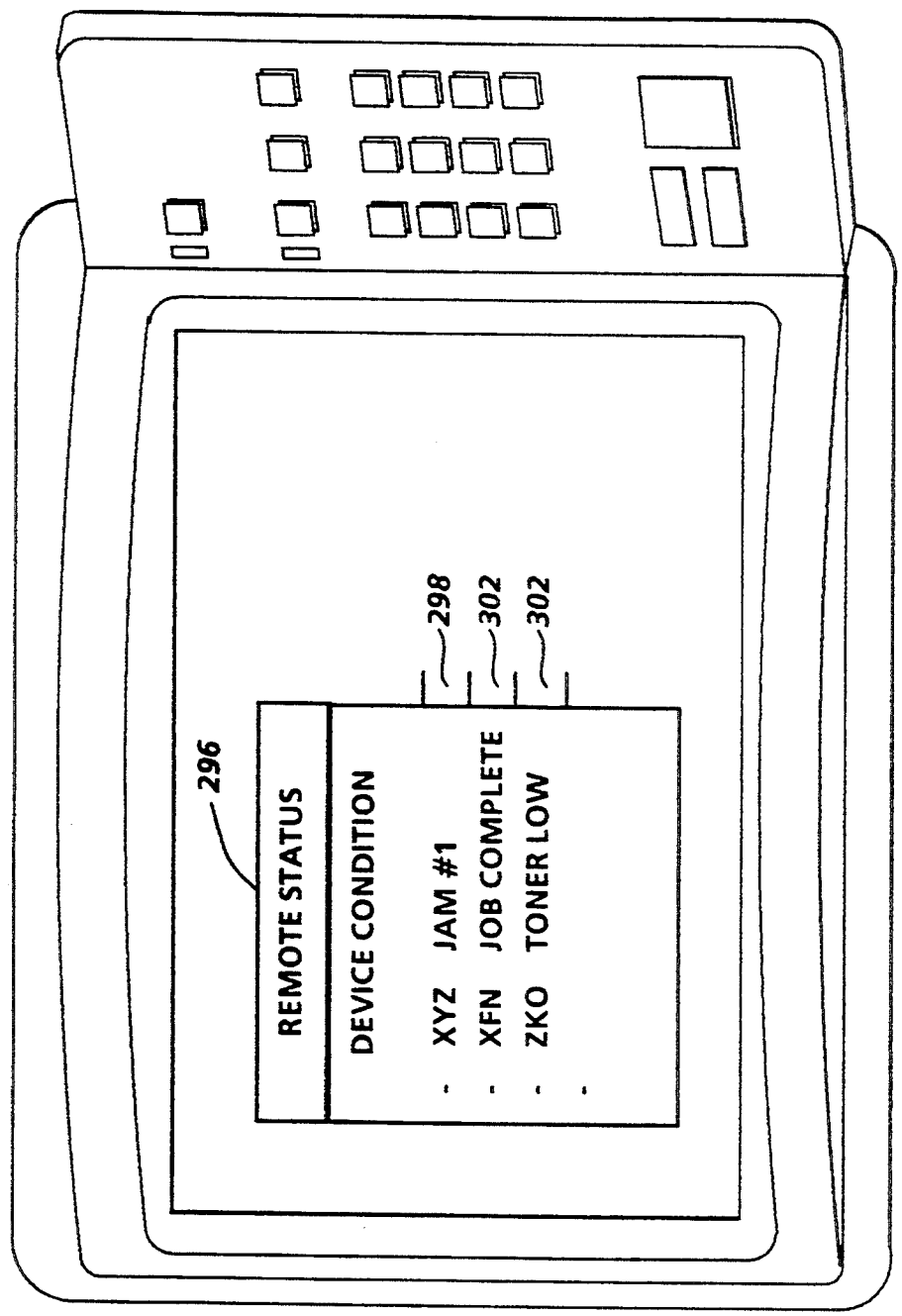
Figure 10:
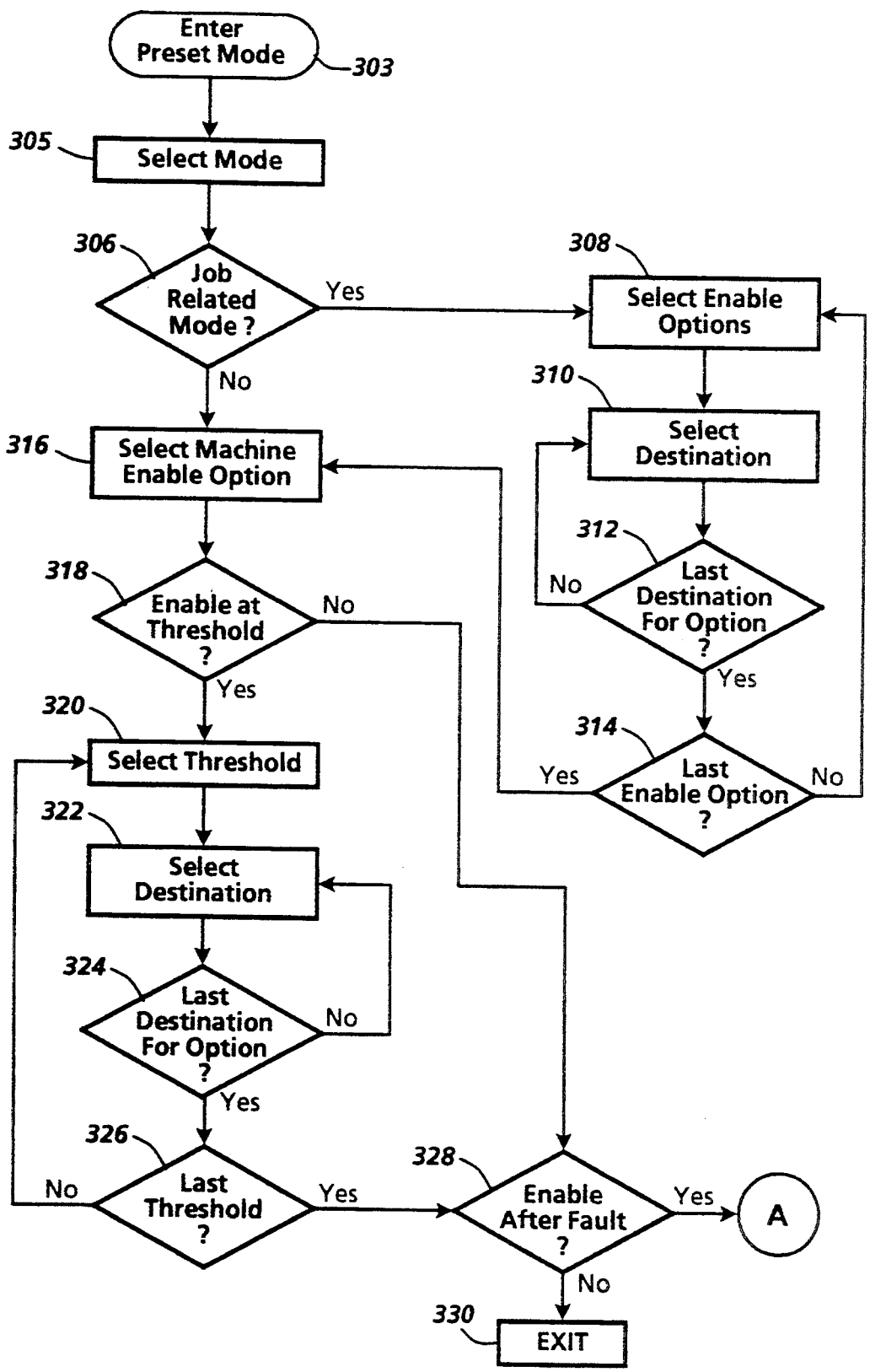
Figure 11:
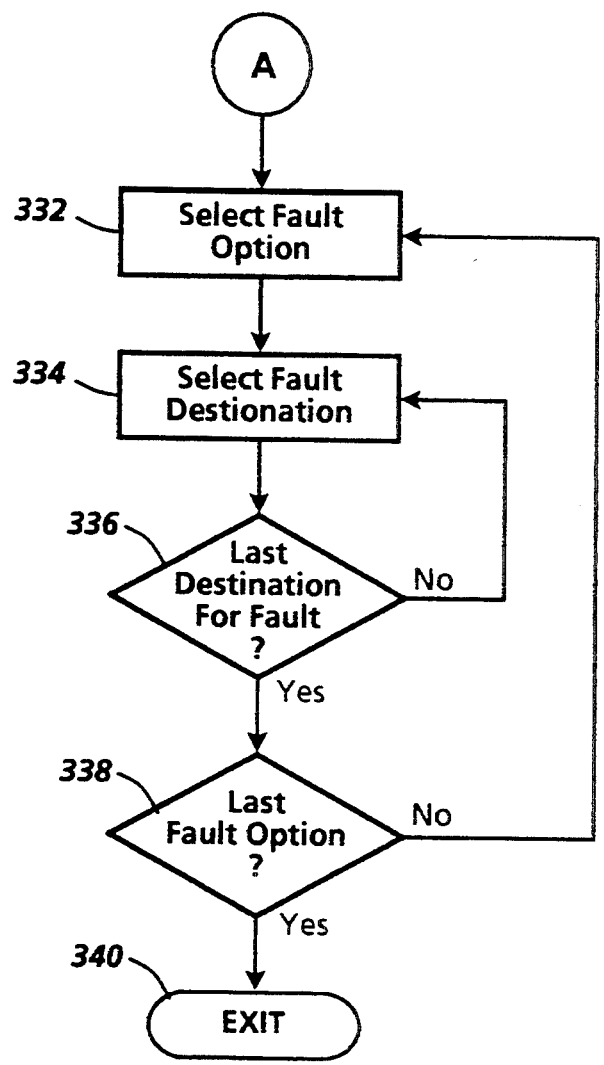
Figure 12:
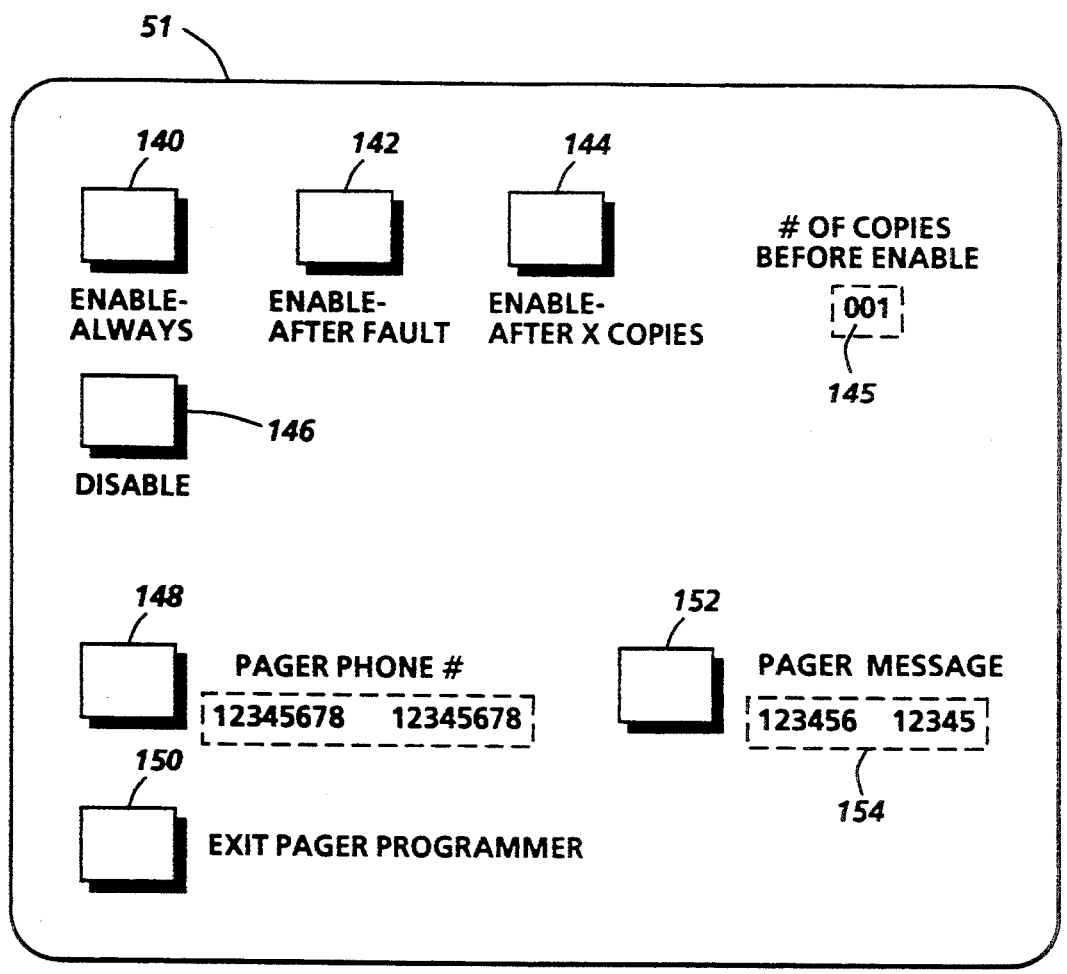
Figure 13:
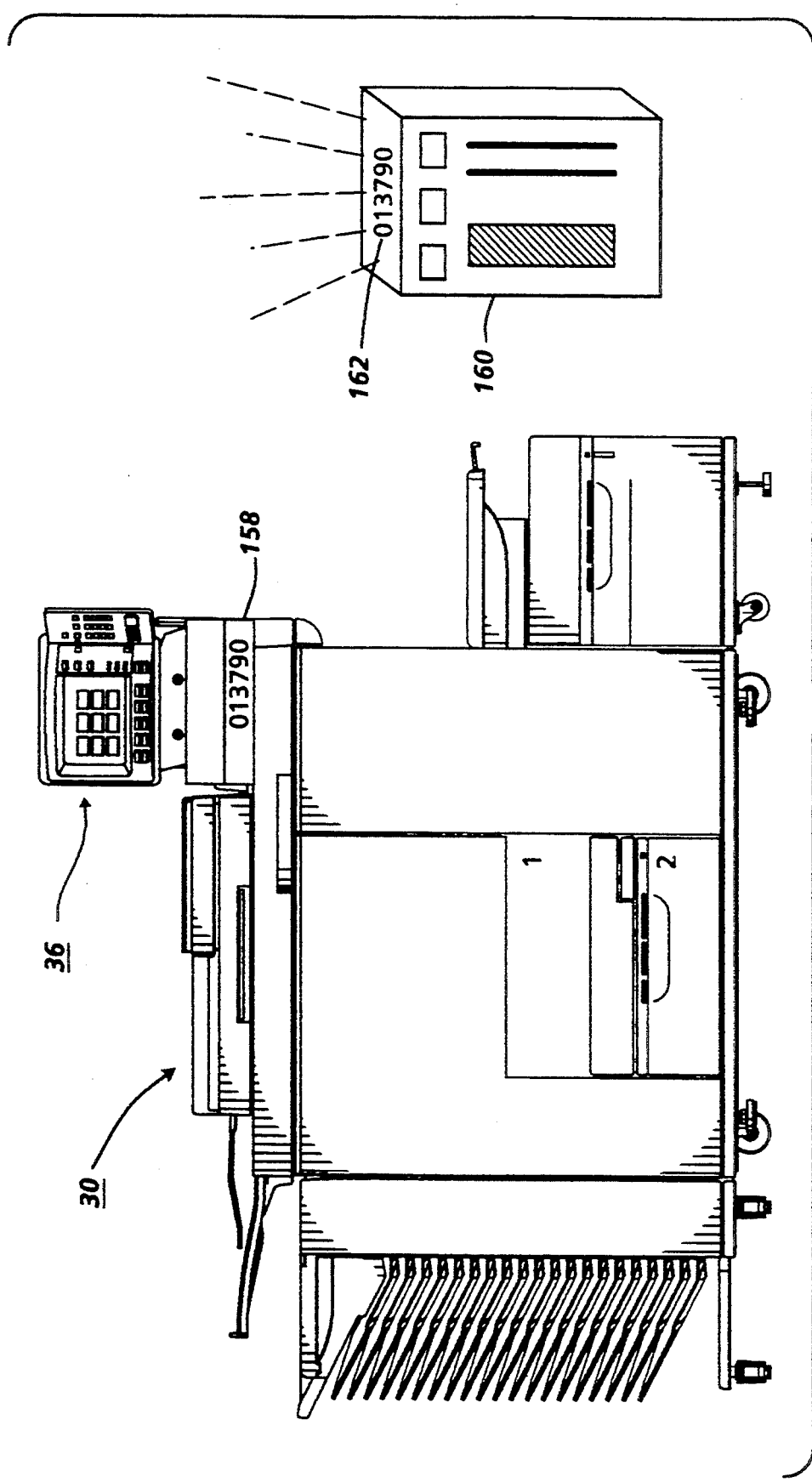
Figure 14:
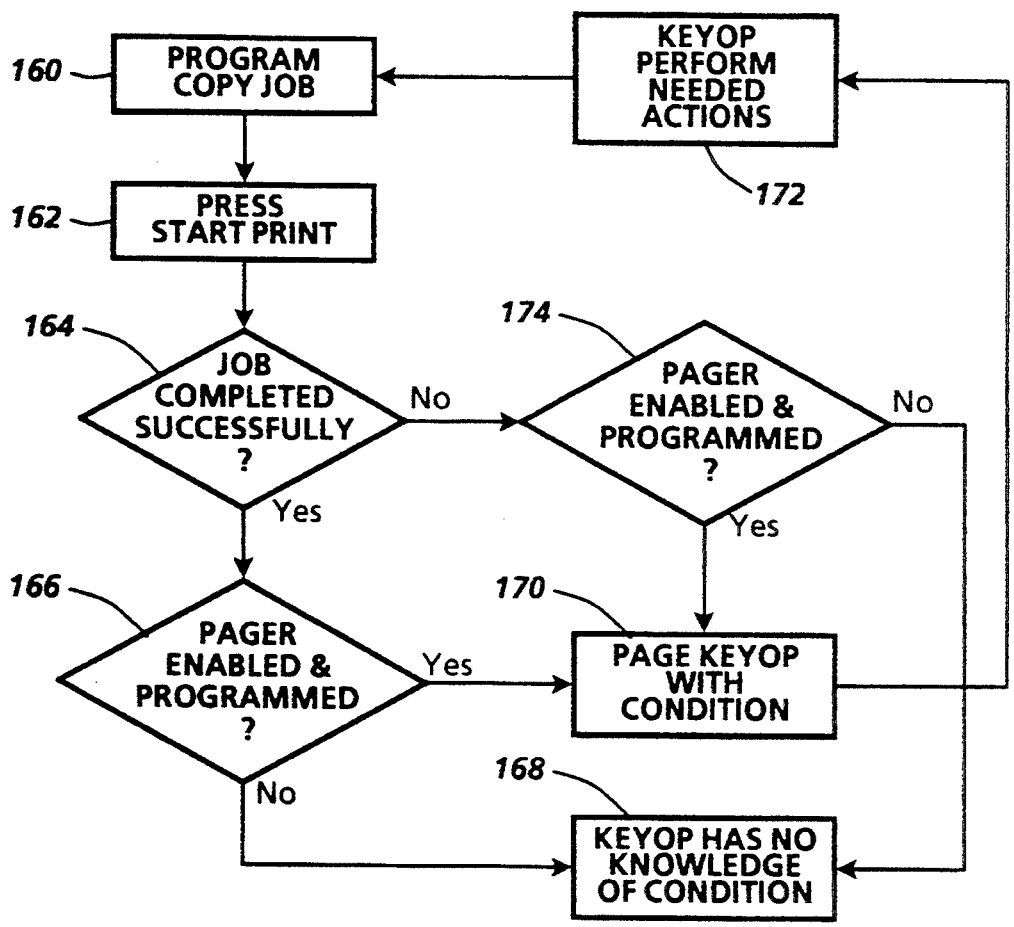
Figure 15:
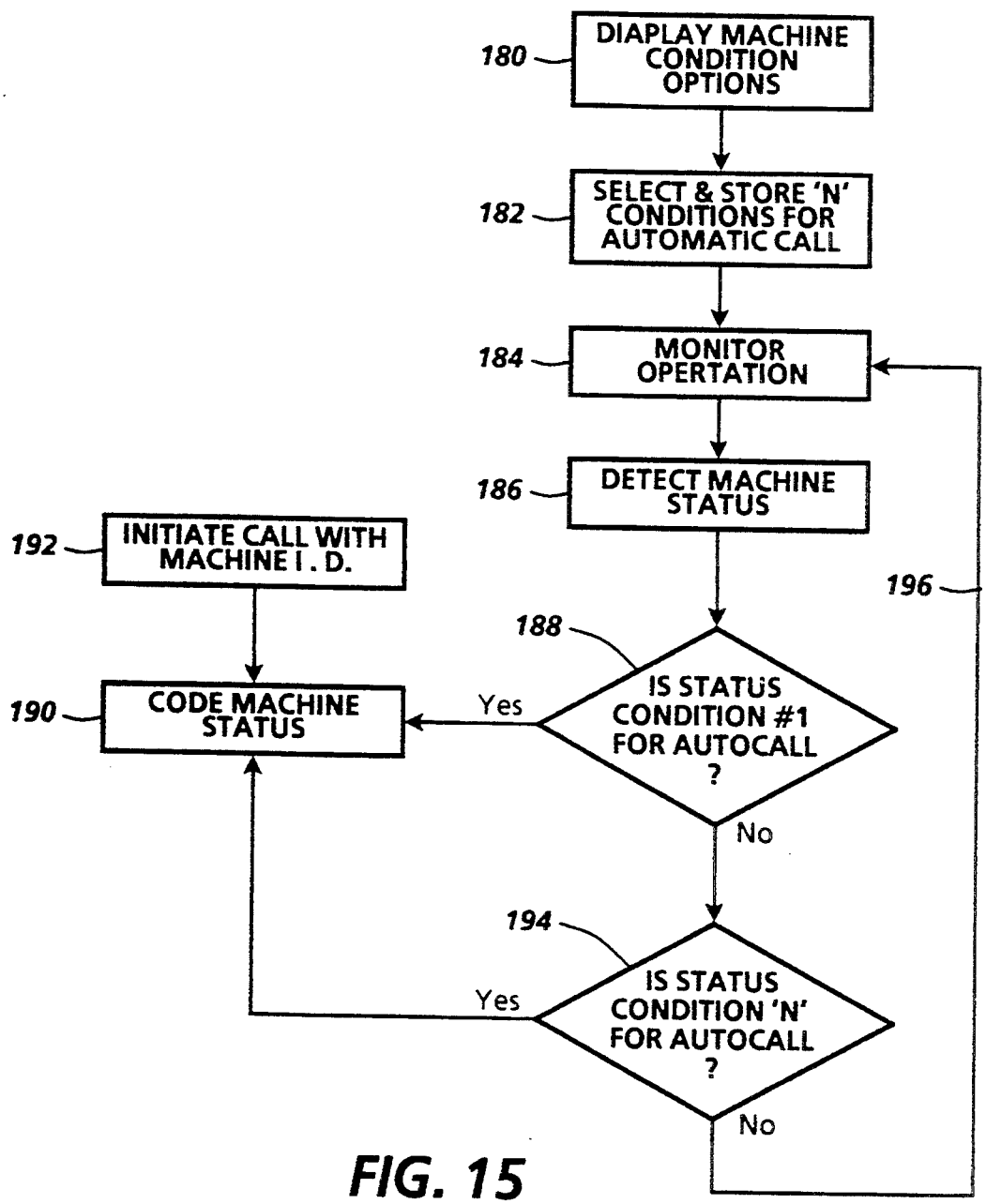

FIGS. 7, 8, and 9 are screen displays illustrating the presetting of remote machines for priority notification in .accordance with the present invention;

FIGS. 10 and 11 are flow charts illustrating priority notification in accordance with the present invention; and FIGS. 12 and 13 are further screen displays illustrating priority notification; and FIGS. 14 and 15 are flow charts further illustrating priority notification.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements. It should be noted that although a specific machine embodiment is disclosed, the invention is applicable to a wide variety of machines such as copiers and printers including black and white, high light color, and full color machines.

Figure 1:
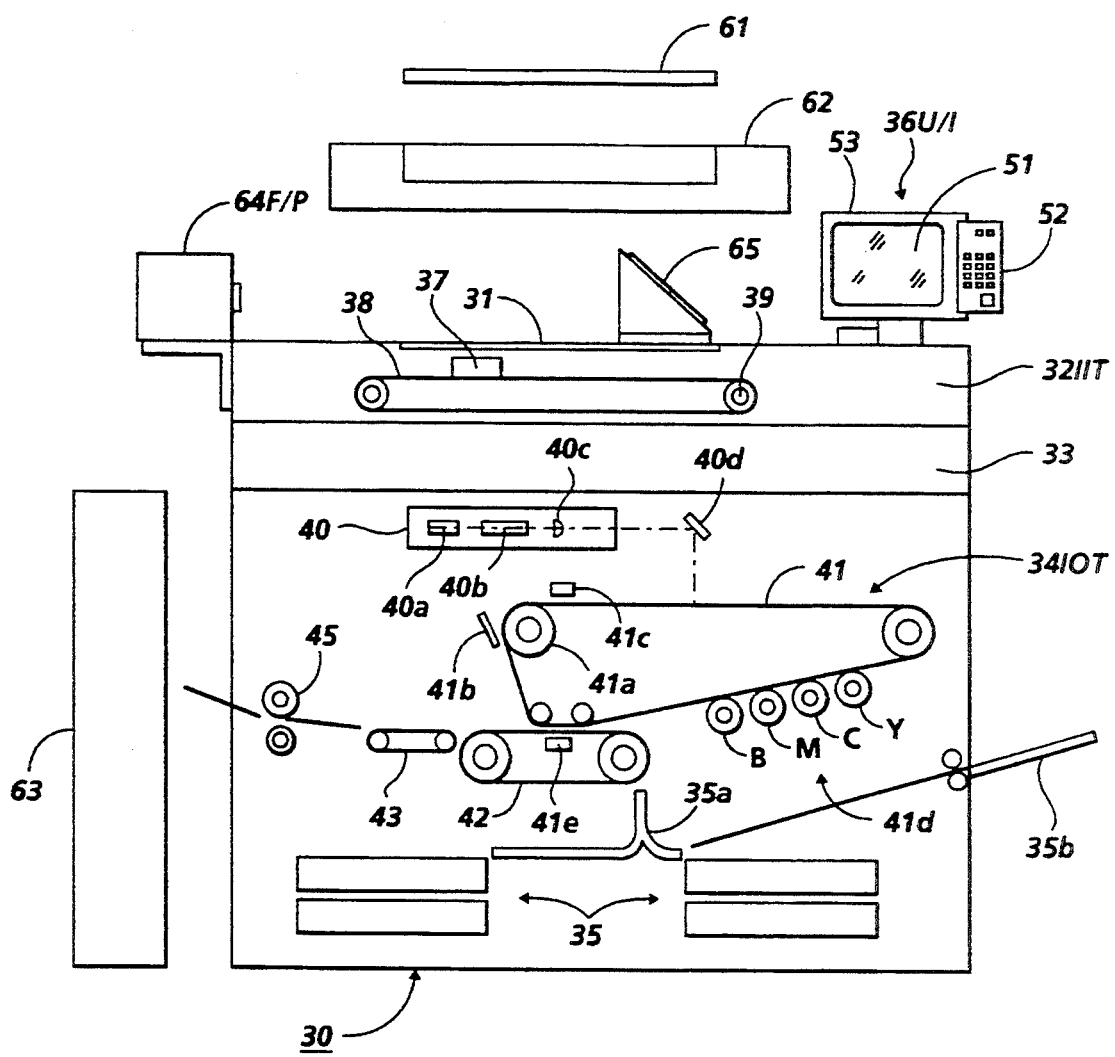
FIG. 1 is a schematic elevational view depicting various operating components and subsystems of a typical machine incorporating the present invention.

FIG. 1 shows one example of the overall construction of a copying machine to which this Invention is applied. A typical copying machine to which this Invention is applied is formed with the base machine 30, composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for control of each of the processing units, such as the IIT, IPS, U/I, F/P, and so forth, which perform the image-forming process for the output signals from the IIT, and these are accommodated further in the electrical control system container 33.

The IIT 32 is composed of an imaging unit 37, the wire 38 for driving the said unit, the driving pulley 39, and so forth, and IIT 32 reads a color original sheet for each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photosensitive material belt 41, converts the image signals from the above-mentioned IPS into optical signals in the laster output part 40a and forms a latent image corresponding to the image on the original sheet on the photosensitive material belt 41 by way of the polygon mirror 40b, the lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U, I 36 is designed for use by the user for making the selections of the desired functions and for giving instructions regarding the conditions for the execution of the selected functions, and this system is provided with a color display unit 51 and a hardware control panel 52 with control and machine feature buttons installed by the side of the said display unit, and it is further combined with touch board 53 with other feature and control switches, so that instructions can be given directly with the "soft buttons" on the screen. For further details reference is made to U.S. Pat. No. 5,032,903 incorporated herein.

Figure 2:
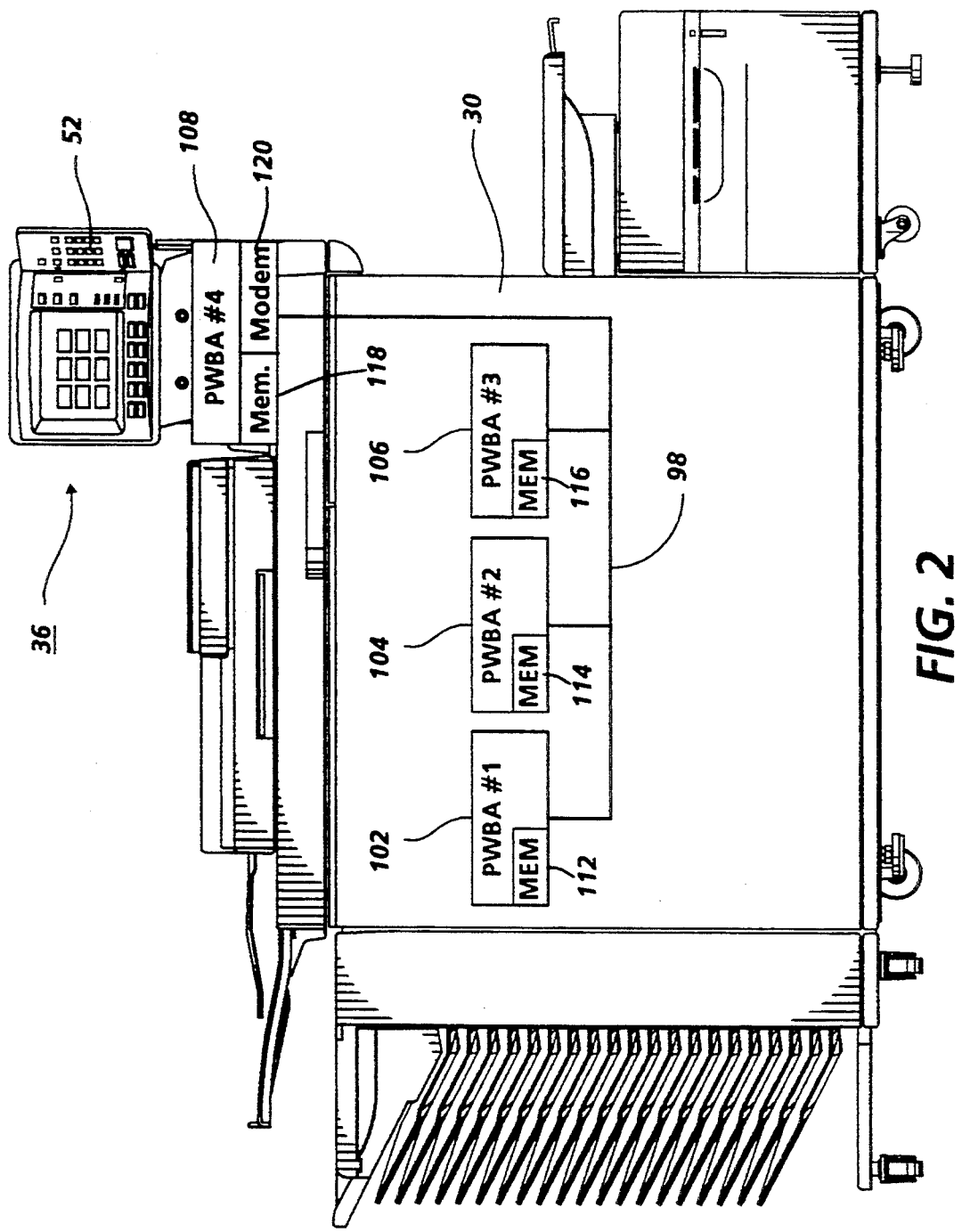
FIG. 2 is a schematic illustrating the control boards for control of the machine shown in FIG. 1.

With reference to FIG. 2, there is illustrated in general block form, the control of the base machine 30 shown in FIG. 1. The base machine is controlled by a plurality of printed wiring boards interconnected to a common channel or bus 98. For purposes of explanation, four printed wiring boards, boards 102 with memory 112, 104 with memory 114, 106 with memory 116, and 108 with memory 116 are illustrated, with printed wiring board 108 being the control for the user interface 36 and the remaining printed wiring boards providing control for predetermined systems and components of the base machine 30. Printed wiring board, 108 is also provided with modem 120 for communication with a remote location. It should be noted that one of the printed wiring boards, for example, board 102 could be the master control for the other printed wiring boards or that there could be any number of master slave relationships of the control boards or distributed control of the various functions of the base machine. It should also be understood that the number of printed wiring boards and the manner of interconnection is merely a design choice and any other suitable control scheme for controlling the base machine is contemplated within the scope of this invention.

Figure 3:
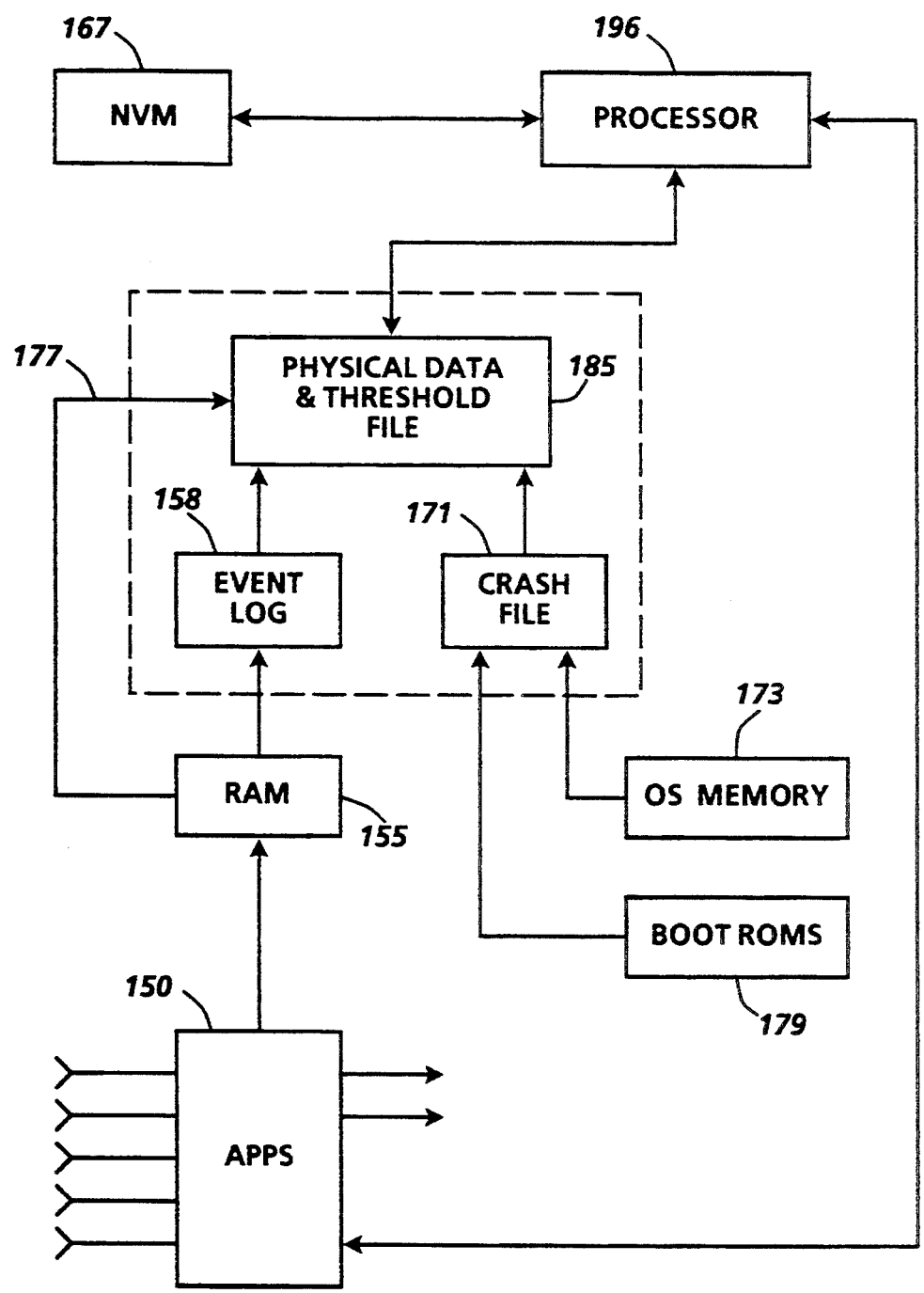
FIG. 3 is a general block diagram of the control depicted in FIG. 2.

For example, FIG. 3 illustrates in block form control elements of a typical controller such as shown in FIG. 2. Referring to FIG. 3, certain key machine operating events (such as current event data) which define the proper execution of the control system such as user interface buttons being set, changes in application software operating states, interlock switches opening and closing, notification of control or system faults, execution of key routines, etc., are input as they occur by the applications system software 150 under control of processor 196 to dynamic memory (RAM) 155. Memory 155, which may be Random Access Memory or RAM type memory, preferably provides a (not shown) circular buffer of predetermined size for storing event data.

A data transfer means in the form of an event spooling routine in software, which is periodically called, writes the event data accumulated in the buffer of memory 155 into an event or occurrence logger file 158 for transmission to the physical data and threshold file 185. Typically, the event spooling routine is repeated on a given cycle, i.e., after a present number of machine pitches. When called, the event spooling routine overwrites a portion of the previous event data stored in the event logger file 158 with the current event data, effectively erasing the previously oldest portion of the event data and replacing it with the newer current event data.

As will be understood, software crashes may occur from time to time during the life of the machine. In the case of most crashes, recovery is made either automatically or through the intervention of the operator, and machine 30 continues to operate normally. However, it is desirable to provide a record of the machine state at the time of the crash for use in diagnosing or servicing the machine. This is done by data logs recorded either at the machine or transmitted remotely to a host machine.

On each software crash, a snapshot is in effect taken of certain predetermined events (termed crash data) in the machine at the time the crash occurs. These events may, for example, consist of an image of each of the operating software (OS) memory maps illustrated as OS memory 173 and boot ROMS 179 and an image of NVM 167. Preferably, a snapshot of the current event data in the buffer of RAM 155 is included. The block of crash data obtained is fitted into one of a number of memory areas reserved for crash files in a crash logger file 171. Crash logger file 171 is a circular queue of crash files with the crash data from each succeeding crash written to the crash files in sequence.

Certain machine operating parameters such as photoreceptor belt charge levels, fuser temperatures, etc. are permanently stored in NVM 167. These parameters represent the optimum or ideal operational settings for the machine which will result in the best possible machine performance. Typically, these operating parameters provide an operating range or window. Suitable sensors (not shown) such as an Electrostatic Voltmeter (ESV) for sensing photoreceptor charge levels, temperature sensors for sensing the operating temperatures of fuser 45, and sheet jam detectors for detecting sheet jams and determining sheet timing, etc. monitor actual machine operating conditions. The physical data and threshold file 185 stores critical machine operating threshold levels for the machine operating components such as the photoreceptor belt charge levels, fuser temperatures, and bias control levels.

As discussed above various sensors and detectors monitor machine operating conditions and at discrete time during the operating cycle of the machine, these conditions are read and the data stored in the event logger file 158 and/or the crash logger file 171 to be stored in the physical data file 185 for evaluation. Thus, during the operating cycles of machine 30, the sensors such as the ESV, temperature sensors, and jam detectors, etc. are read and the data obtained input via line 177 to the machine physical data file 185. Also, any other suitable data for diagnostics, machine monitoring, or machine usage are suitably stored in the machine physical data file 185 or any other suitable memory for access at the machine by a service representative or stored for transmission to a remote location. For more detail of a typical control as described above, reference is made to U.S. Pat. Nos. 5,032,903; 5,138,377; and 5,218,406 assigned to the same assignee as the present invention and incorporated herein.

Figure 4:
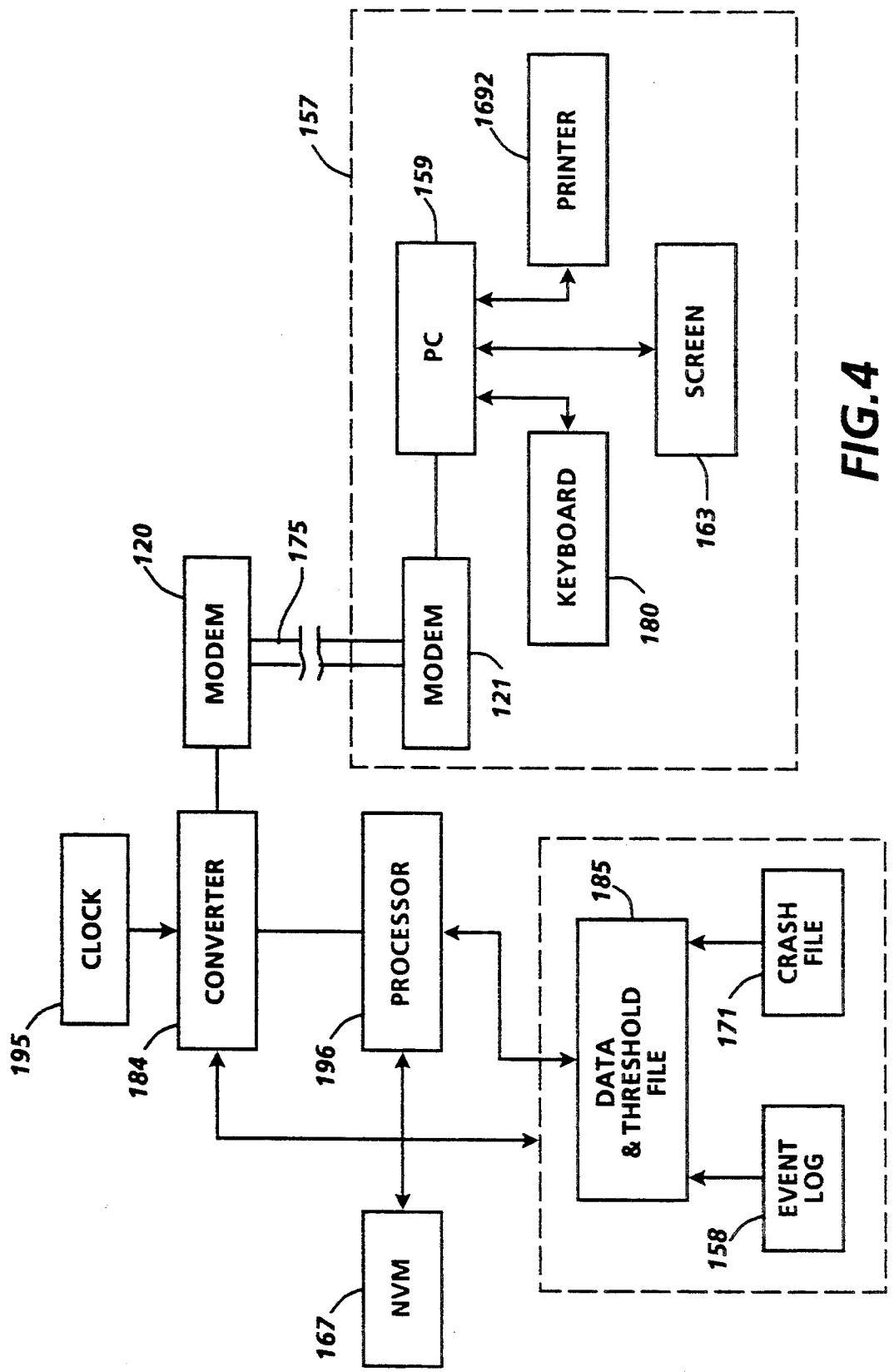
FIG. 4 is an illustration of the control of FIG. 3 interconnected to a remote host station in accordance with the present invention.

In accordance with the present invention, with reference to FIG. 4, there is shown a remote communication system including remote host 157 connected to machine 30 through a suitable channel such as telephone line 175 and modems 120, 121 or any other suitable medium such as local and wide area networks, cellular phone channels, infrared links, and serial channels such as well known RS232 and SCSI serial ports. Selected machine data is downloaded to remote host 157 by communicating between the host 157 and memory in machine 30 such as Data and Threshold File 185. Communication can be initiated by either remote host 157 or machine 30. It should be noted that machine 30 and remote host 157 can be interconnected to other suitable stations or devices on a network or by any dedicated communication channel.

A computer such as PC 159 with keyboard 180, printer 162 and user interface with screen 163 is provided at the remote host 157 for use in establishing communication with modems 121, 120 for transmission of data from machine 30 via line 175 to host 157 and from host 157 to machine 30. A suitable data bandwidth converter 184 at machine 30 converts data to the clock rate required for transmission over line 175, it being understood that the rate at which data is handled by machine 30 is ordinarily different and typically substantially greater than the data transmission rate of telephone line 175. In this regard, a clock 195 is connected to converter 184. The clock 195 is used to determine frequency of testing the state of the machine for possible transfer of an alert. Similar, not shown converter and clock are provided with remote host 157.

Figure 5:
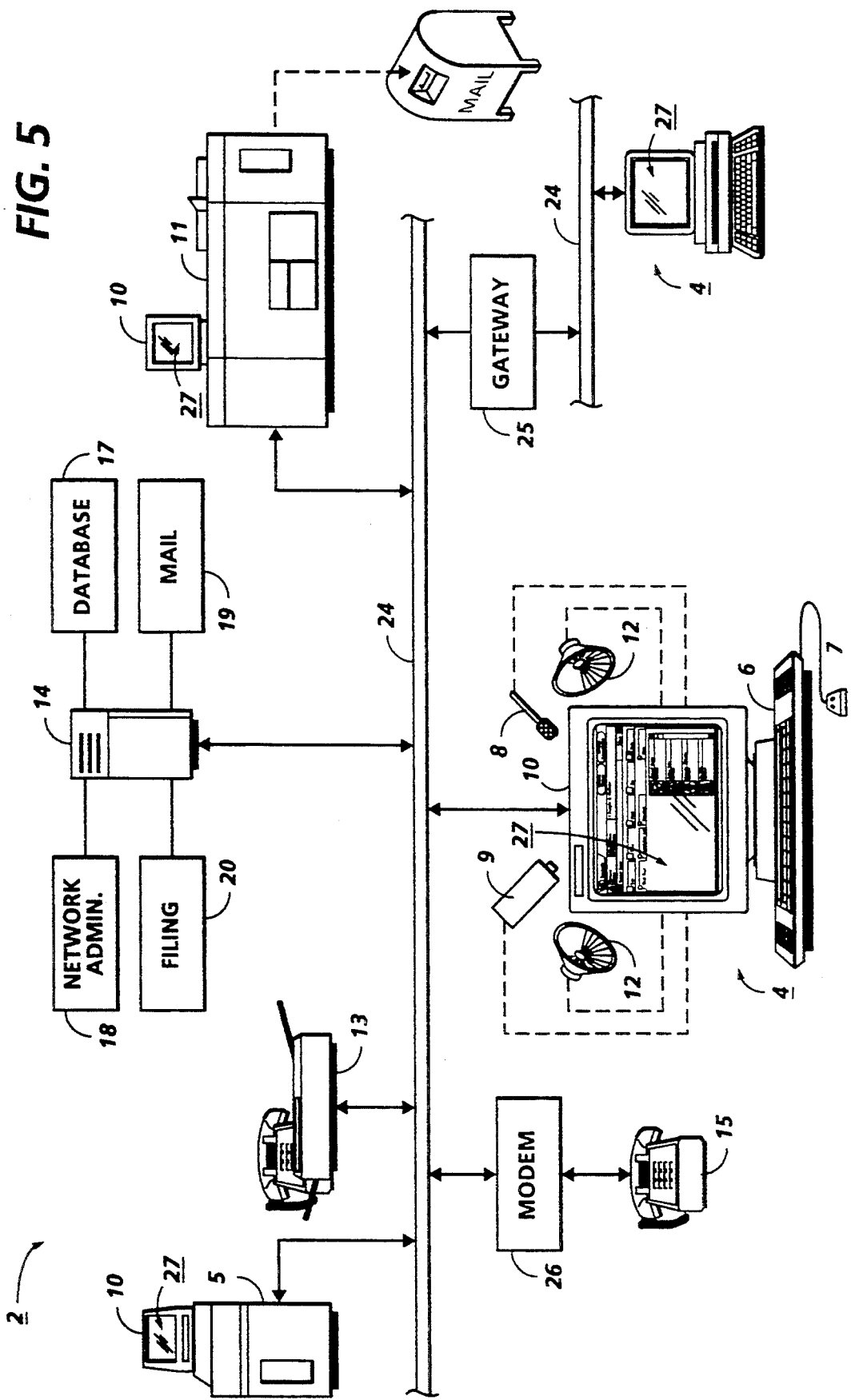
FIG. 5 illustrates a typical network of remote devices incorporating the present invention.

In accordance with the present invention, FIG. 5 illustrates a typical system network of a plurality of interconnected or intercommunicating devices for automatic notification. Such devices can be remote locations to receive notification data, remote locations with user interfaces to pre-set or program specific devices with notification conditions and status, or simply devices that are configured to automatically transmit data upon detection of given conditions or events.

An exemplary multimedia device information system or network 2 includes any number of work stations 4 with or without sophisticated diagnostic and control elements such as an Expert System and includes devices such as digital copier or scanner 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes database system 17, network administration system 18, mail system 29 (e.g. email, voice mail) and data storage and retrieval system 20, and can be physically configured using optical drives, hard drives, floppy drives and/or tape drives. Work station 4 typically is connected to other systems and devices through local area networks, typically, (LAN) 24, gateways 25, and/or modems 26. Work station 4 includes a user interface (UI) 27 that uses icons and windows to represent various data objects and user applications such as display illustrating an office desktop metaphor employing various abstractions of a typical office and work station environment.

Figure 6:
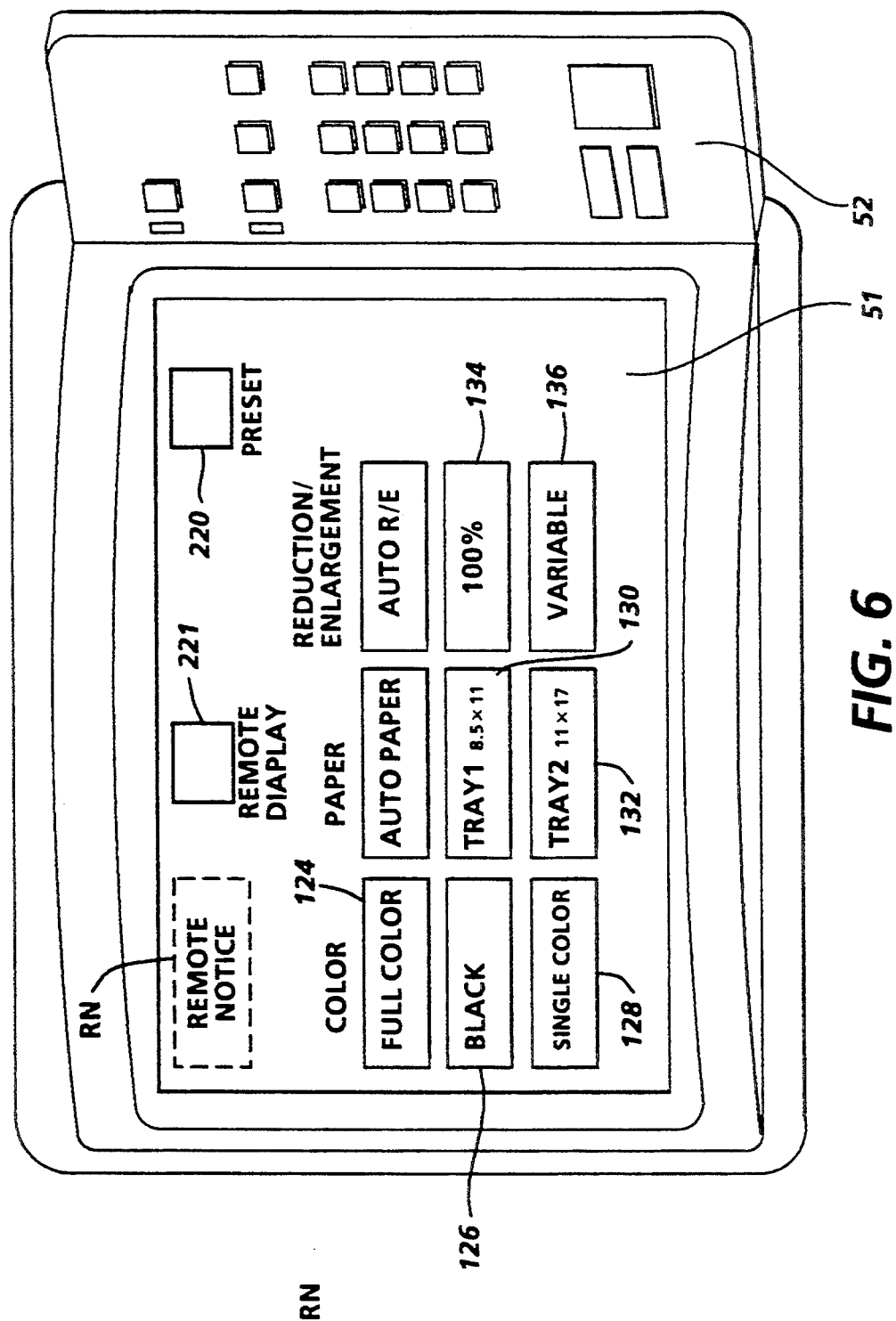
FIG. 6 is an exploded view of a typical touch monitor screen shown in FIGS. 1, 2 and 5 incorporating the present invention.

FIG. 6 is merely a simplified version of the display unit 51, and hardware control panel 52 of the user interface 36 of machine 30 illustrating various soft control buttons such as full color 124, black 126, single color 128, tray 1 (130), tray 2 (132), and auto reduction/enlargement including 100% (134) and variable 136. The printed wiring board 108 controlling the user interface 36 is able to monitor communications on the network 98 (FIG. 2) and display the communications on the screen 51. Each of the memories 112, 114, 116, and 118 suitably store key status, event, and fault data related to the machine for access by a service representative, and display on screen 51, or for remote transmission via modem 120 for display on screen 163 at remote side or host machine 57. In the event of a machine malfunction, a service representative enters a hard key sequence that is recognized by the printed circuit board 108. This can be entered at machine 30 or remotely from host machine 157. The recognition of the key sequence by the printed circuit board 108 enables the control 108 to monitor the communications network 98 and display communications either on screen 51 of machine 30 or on screen 163 at host machine 157.

The machine operator, as is well known, is able to set up or program the next job or a future machine job as illustrated by the touch screen 51 in FIG. 7. That is, by suitable selection of displayed features, a job can be programmed such as full color, black, or single color, or a particular size paper such as tray 1 containing 8.5×11" copy sheets or tray 2 containing 11"×17" copy sheets, or select a particular reduction/enlargement mode for example, 100% or variable.

It should be understood that the screen 51 of FIG. 6 is exemplary of typical display screens at user interfaces and that additional soft buttons can be displayed in the same frame or subsequent frames and can be selectively engaged by the operator or service representative. Also there can be a selection of suitable hard buttons shown on the panel 52, also available at keyboard 180 of host machine 157 for various operations and functions. For example, either hard or soft buttons can be used to select full size copies, 94% size copies, 77% size copies or any variable size copy as well as buttons to engage a recirculating document feeder to operate in a collate mode or non-collate mode. In addition, suitable buttons can enable the user or service representative to select, in a given machine environment, finisher operations such as stapled, non-stapled, non-collated, and such features as duplex copying and offset stacking and to perform various recording and diagnostic operations.

The remote notification preset mode for presetting conditions requiring automatic notification to selected remote stations is entered into by any suitable switch such as preset button 220 shown in FIG. 6. Also, illustrated in FIG. 7 is a pop up notice RN in any suitable location on the screen display 51 to alert the operator or user at screen 51 that a notice has been transmitted to the location of the device incorporating screen 51. Such a notice can be any suitable eye catching notice such as a highlighted message or flashing signal prominently displayed to attract the attention of an operator or user at the receiving station. Upon the receipt of the notice, a suitable switch such as the remote display button 221 is activated to display in more detail the content of the received message or messages.

Upon engagement of the preset mode button 220, a preset reporting condition mode screen will appear to the operator such as the screen illustrated in FIG. 7. In accordance with the present invention, various reporting and operating features are available to the operator for setting a machine to automatically report predetermined conditions to another machine, to a host machine, to a portable receiving device or pager or to any other remote location requiring notification. It should be noted that, although the following description pertains to the setting of reporting conditions in the control of the machine 30 by the user of the interface of machine 30, it is well within the scope of the present invention to be able to set predetermined reporting conditions for any number of systems or devices within a network or orbit of devices from a given system or device and to set the conditions for any of these systems or devices to automatically report to any other system or device.

The selection of conditions for automatic reporting can be any suitable arbitrary selection of key reporting indicators appropriate to any given user interface. In a preferred embodiment, as illustrated in FIG. 7, the selection process is achieved through a hierarchy of selection categories leading to selection of more detailed events or conditions. The first general category is whether or not the conditions are machine related (accessed by button 222) or are job related (accessed by button 224). Typical of job related events for automatic notification are a notification that the job has been completed (set by switch 234), notification after the completion of X number of copies (enabled by switch 236), or notification after a given job interrupt (programmed by switch 238). Switches 234, 236 and 238 could be hard button switches on a keyboard or soft button display switches as illustrated in FIG. 8.

Switches 234, 236, and 238 are merely illustrative and it is within the scope of the present invention to include any other suitable notification, event or condition. Switch 232, enable always, allows the user to select all of the conditions that are available for automatic reporting. Engaging button 232 would automatically set up for notification a preset default condition of a number of copies completed requiring notification. To change the preset number of copies requiring automatic notification, the user would engage switch 236 and then key into the control the required or desired number of copies for automatic notification using the user interface keyboard or any other suitable keyboard such as a soft display keyboard that could be provided on the interface display.

In accordance with the present invention, once the job related automatic reporting conditions are selected, the appropriate remote station for receiving the automatic report is selected using scroll switch 250 and select switch 252 in cooperation with display window 240 titled "Select Call Address". Using the scroll button 250, the user scrolls or displays remote stations within the communications orbit or large area network accessible by machine 30. For example, window 240 illustrates host machine No XYZ at window slot 242, workstation AB at window slot 244, workstation AC at slot 246 and a pager or any other portable unit in slot 248. Within the window 240, one of the slots will be highlighted or bracketed as shown at slot 242 to be the one that will be selected to receive the automatic reporting upon the activation of select switch 252. It should be noted that any number of appropriate remote stations could be included for display in window 240 and that more than one remote station can be selected by select button 252 to receive notification of job related conditions.

In accordance with the present invention, by engaging the switch or button 222, the operator or user sets up the machine related mode for identifying machine related conditions to be automatically reported to a given remote station. The machine related conditions, generally relate to machine diagnostics, machine components, and in general to the events and conditions related to the operation and status of the machine rather than to the initiation and completion of a given jog requirement. Switches or buttons 226 "enable always", 228 "enable after fault", and 230 "enable at threshold" are further classifications of machine related events and conditions. Switches 228 and 230, upon engagement, will provide the operator with a more detailed breakdown of conditions and events to be automatically transmitted to a remote station as illustrated by the options shown in FIG. 8. The enable always button 226 merely gives the user the option to require notification whether or not the event or condition is after a fault or at a threshold level.

With reference to FIG. 8, if enable at threshold button 230 is engaged shown in FIG. 7, window 254 will display various options requiring automatic response. As an illustration, window 254 shows three conditions of toner supply; medium, in slot 262, low in slot 264 and empty in slot 266. Other threshold levels to be reported are shown in slots 268, 270, and 272, in particular, a cumulative count "X" number of images processed, "Y" number of images processed, and "A" number of cumulative photoreceptor revolutions. Such information, in particular, as sent to a host station or a service representative location can alert a service representative of cumulative machine wear and such things as component depletion in order to schedule or be prepared for a service call at a particular machine. As in the case of job related conditions, the user can scroll and select various thresholds to be reported using scroll button 256 and select button 260.

As an option, a change number button 258 is available to change the threshold numbers X, Y and A as shown in slots 268, 270, and 272. Once a given slot is suitably highlighted for example, slot 268, by activating the change number button 258, the operator or user can change the threshold level of the number of images for notification to any suitable number. These numbers can be keyed in at any suitable keyboard at the user interface. In a similar manner, upon activation of the enable after fault button 228, window 274 appears with various fault conditions to be scrolled using scroll button 282 and selected by select button 286. For example, window 274 illustrates in slot 276 "X" number of software crashes, slot 278 "Y" number of paper jams of a category number 1, and slot 280 for "Z" number of paper jams of a number 2 category.

It should be understood that various jam and malfunction conditions or recorded cumulative numbers of such conditions can be set for automatic recording to a remote station. Change button number 284 allows the user to change the threshold numbers of various set jam counts or malfunction counts. As discussed with FIG. 7, for any selected threshold or after fault condition to be recorded, the operator selects the receiving station using scroll 250 and select button 252. Window 240 can be the same window 240 as shown in FIG. 6 to scroll the various remote stations to be selected for receiving the particular selected machine related faults.

In accordance with the present invention, FIG. 9 illustrates a typical display screen at a remote station receiving the automatic call or reported information. Once the remote receiving station has received reported information or notification, any suitable visual or audio indicator can be activated to alert the operator at the remote receiving station. For example, as shown in FIG. 5, on screen 51, a remote notice RN window is shown in phantom. This could be a blinking light, a steady back lit message with audio alarm, or any other suitable alerting mechanism. Upon being alerted, the operator engages remote display 221 which would display on screen 51 a frame such as illustrated in FIG. 9 giving the status of various remote stations.

The remote status window 296 discloses various reporting devices and current conditions such as the device XYZ with a jam #1 condition (in slot 298), device XFN with a job complete condition (in slot 302) and device ZKO with a toner low condition (in slot 304). The currently reporting device could be indicated by highlighting, for example, by highlighting device XYZ in slot 298.

This general procedure is illustrated in the flow chart shown in FIGS. 10 and 11. In particular, block 303 illustrates entering the automatic notification preset mode and block 305 illustrates selecting either the machine related mode or the job related mode as illustrated by buttons 222 and 224 in FIG. 7. Decision block 306 determines whether the mode is a job related mode and if yes, there is a selection of the enable options as illustrated at block 308, in particular the options shown by buttons 232, 234, 236, and 238 in FIG. 7. Once an enable option has been selected, the next step is to select the destination for receiving the notification as shown at block 310. After each selection of a destination, illustrated at FIGS. 7 and 8 at window 240, there is a determination as to whether or not it is the last selected destination for the particular enable option selected as illustrated at decision block 112. If not, another destination is selected until there are no more selected destinations.

After the last selected destination for a particular selected job related event or condition, there is a determination whether or not the selected enable option is the last selected option as shown at decision block 314. It should be understood that the selected options are suitably recorded in appropriate memory in the machine 30 control as well as a record of the destination or remote station to receive the automatic notification. During the operation of the machine, the control will continually scan and monitor appropriate memory locations for the selected conditions such as illustrated by the data and threshold file 185 in FIG. 3. When a particular condition or threshold is reached as a result of machine control monitoring the machine sensors and switches, a coincidence of comparing of present machine conditions with the stored reference or reporting conditions, the machine will trigger an automatic transmission or notification to the selected remote stations.

Returning to FIG. 10, block 314, upon completion of the designation of the last enable option for the job related mode, in accordance with the procedure for setting notification conditions, the operator will then set the machine related options as illustrated at block 316. If an enable at threshold option is selected as shown at 318, the thresholds will be selected at block 320, and for each threshold selected a particular destination for notification as illustrated at block 322. Block 324 illustrates the selection of appropriate destinations for each threshold, and once all the destinations are selected, as shown at block 324 for a given threshold, there is the opportunity to select and designate any given number of thresholds as shown at block 326. In a similar manner, there is the opportunity for the user to set conditions for reporting of fault conditions as illustrated at block 328. Block 332 in FIG. 11 shows selecting of default options and as discussed above, blocks 334 and 336 illustrate a selection of a given destinations for each selected fault option, and block 338 illustrates the option to select the various fault options before the sequence exits as shown at either blocks 340 or 330.

In accordance with the present invention, with reference to FIG. 12, there is shown a typical screen display for programming or presetting a machine for communication or notification to a portable remote device. For setting up communications to a simple portable device such as a digital pager, a more simplified procedure would be preferable. This procedure is primarily to alert and notify a machine monitor responsible for a cluster of machines at a single location or a set of machines at divergent locations. Notification of events stopping a job run such as out of paper, machine jam or shutdown, and status such as job completion and time to completion become significant to maintain an efficient reproduction operation.

For a typical notification set-up screen display soft button 140 on screen 51 illustrates "enable always" that is, remote communication or notification will be generated at anytime upon the occurrence of preselected events. On the other hand, button 142 enables the system to initiate remote communication only after a given fault, and button 144 enables the system to initiate a remote call only if a particular job is programmed for "x" or greater number of copies. Window 145 illustrates a button to enable the operator to preset "x" for a given number. Other buttons for presetting features are contemplated such as specifically identifying only certain faults that would trigger the remote call. These faults could be an out of copysheet condition in general, an out of copysheet condition at a specific copysheet tray, or a low toner condition. Other conditions could be preset such as making the remote call after a given job has been completed or after a predetermined period of time after a job has been completed. The disable button 146 provides the option to deactivate or disengage the remote call system at the preference of the machine monitor or key operator as conditions might dictate.

Button 148 provides the means to identify the particular remote station. The number could be the number of a machine at a remote location interconnected over telephone lines or preferably the number of a portable pager in the possession of a key operator or machine monitor. Button 152 provides the means to code various messages as illustrated in window 154. These coded messages can be displayed on any suitable pager such as the Mobile Comm R digital pager. Button 150 on screen 51 merely enables the machine operator to exit the pager programming frame to other frames for display at the user interface.

With reference to FIG. 13, there is illustrated machine to pager communication. The machine 30 with user interface 36 has a machine identification number 01379 illustrated at 158. In accordance with the present invention, pager 160 is illustrated at a location remote from machine 30. Upon detection of any given condition such as an out of paper condition, a predetermined fault condition, or an end of job, machine 30 automatically initiates a call to pager 160 via modem 120 shown in FIG. 2. It should be understood that any of the various conditions to initiate the automatic call have been suitably sensed within machine 30 and an indication or data pertaining thereto has been suitably stored in memory 112, 114, 116, or 118 or any other suitable temporary or random access memory. Upon sensing the condition, the control initiates the external call via modem 120 by any suitable means such as well know in the art. The pager 160 receives the call and provides an audio or other signal to manifest that a call is also being received as is also well known in the art. At a suitable window 162 of pager 160, the transmitted message or code from machine 30 is displayed, for example, the identification number 013790 for the machine 30 to identify the calling source. In addition to the identification 013790, other suitable coded messages can be transmitted and displayed in window 160. For example, the displayed codes would represent the predetermined conditions set into the machine 30 by the operator with the pager programming frame as illustrated in FIG. 4. These coded message would then be observed by an operator or machine monitor in possession of the pager 160 to identify a particular machine having a particular condition.

FIG. 14, illustrates a typical remote notification procedure for notification to a portable device such as a pager. A job is set up and initiated at blocks 160 and 162. At block 164 there is a decision as to whether or not the job has been completed. Job completion could have been one of the conditions preset into the control. If the job has been successfully completed, there is a decision as to whether or not the remote pager has been enabled and programmed for this particular condition as illustrated at block 166. If the pager has not been enabled and programmed for remote call initiation, as illustrated at block 168, there will be no notification to the remote pager. The machine monitor or key operator will therefore have no knowledge of the particular condition and the machine will remain idle unless pre-programmed for multiple jobs.

If in fact the machine has been pre-programmed to initiate a remote call after the successful completion of a job, then the key operator will be paged upon completion of the job illustrated at block 170. Block 172 merely illustrates the key operator responding in some manner to the remote communication, presumably to return to the machine to initiate another job or perform any other maintenance routines. If the job has not been successfully completed then at block 174 a determination is made as to whether or not the remote call has been programmed and enabled. If not, no message will be communicated remotely as illustrated at block 168 and the machine will presumably remain idle. On the other hand, if the machine has been preset for a remote communication upon the particular event preventing completion of the job then, at block 170 a remote communication will be made to the pager with a code identifying the machine and the specific condition condition generating the call.

With reference to FIG. 15, there is illustrated an automatic call procedure to a remote portable device in response to sensed conditions. It should be noted that similar procedures would apply for automatic call or notification to any designated remote station in response to sensed conditions. At block 180 there is a display of machine condition options to be preset for automatic call, at block 182 the key operator selects "N" conditions for automatic call. It should be understood that the necessary codes to identify the conditions for call are already assumed to predetermined. At block 184, the machine operation has been initiated and the machine is in a monitoring operation. At block 186 there is a detection of a machine status or condition. This could be any fault, condition, or event of the machine. Most of these detected events or conditions, however, will not initiate an automatic call to the pager. At block 188, the decision is made as to whether or not a detected machine status is status condition #1 of the stored "N "conditions for automatic call. If yes, the machine status is converted into a code at block 190 for remote communications, and at block 192, a call is initiated to the remote station or pager with the appropriate machine identification.

If the detected machine status on the other hand, is not condition 1 of the stored "N" conditions a decision is made as to whether or not the detected machine status is condition #2 of the stored "N" condition. If yes, a remote communication call is initiated identifying condition #2. If not, the detected machine status is compared to stored condition 3. This sequence continues until, if the detected machine status is not any of the 1 through "N" minus one of the stored "N" conditions for automatic call, the decision is made as to whether the detected machine status is condition "N" for automatic call as illustrated at decision block 194. If yes, the machine status is coded at 190 and the call is initiated to the remote station with the machine identification as illustrated at block 192. If the detected machine status is not conditioned "N" of the stored "N" conditions for automatic call, then no automatic call is required and the machine continues operation and monitoring as illustrated by the loop 196 to block 184.

While the invention has been described with reference to the structure disclosed, it is not confined to the details set forth, but it is intended to cover such modifications or changes as may come within the scope of the following claims.

We claim:

1. In a system having a plurality of devices interconnected to a host machine, each of the devices having image processing components for forming images on a medium and a controller for directing the operation of the image processing components including a device monitoring element to sense predetermined device conditions, a method for notifying the host machine in response to device conditions detected by the device monitoring element comprising the steps of:
   displaying device condition options at the host machine for presetting predetermined device conditions for automatic notification to the host machine,
   selectively presetting predetermined device conditions for a given device, said given device monitoring the operation of the image processing components relative to predetermined conditions,
   detecting a device condition in one of said devices to be a condition for automatically notifying the host machine, and
   automatically initiating a notification of the device condition to the host machine.

2. In an image processing apparatus having image processing components for forming images on a medium, a controller for directing the operation of the image processing components including a machine monitoring element to sense predetermined machine conditions and an operator interface connected to the controller, the image processing apparatus adapted for communication with a plurality of remote stations, the method of automatic notification to a selected remote station in response to the machine conditions detected by the machine monitoring element comprising the steps of:
   selectively programming from the operator interface the conditions for notification to a given remote location,
   monitoring the operation of the image processing apparatus relative to forming images on the medium,
   detecting a first machine condition,
   determining the first machine condition to be a condition to require notification to a first remote location,
   automatically initiating a notification to the first remote location,
   detecting a second machine condition,
   determining the second machine condition to be a condition to require notification to a second remote location, and
   automatically initiating a notification to the second remote location.

3. The method of claim 2 wherein the step of selectively programming the conditions for notification includes the step of programming from a given remote station.

4. The method of claim 2 wherein the step of selectively programming the conditions for notification to a given remote location includes the step of programming a job interrupt condition for notification to the remote location.

5. The method of claim 2 wherein the step of selectively programming the conditions for notification to a given remote location includes the step of programming a low toner condition for notification to the remote location.

6. The method of claim 2 wherein the step of selectively programming the conditions for notification to a given remote location includes the step of programming an end of job condition for notification to the remote location.

7. The method of claim 2 wherein the operator interface includes a display and the step of selectively programming the conditions for notification to a given remote location includes the step of displaying program options for operator selection.

8. In an image processing apparatus having image processing components for forming images on a medium, a controller for directing the operation of the image processing components including a machine monitoring element to sense predetermined machine conditions, the image processing apparatus adapted for communication with a plurality of remote stations, the method of automatic notification to a selected remote station in response to the pre-determined machine conditions detected by the machine monitoring element comprising the steps of:
   pre-setting the predetermined machine conditions from a first remote location,
   monitoring the operation of the image processing apparatus,
   detecting a machine condition preset from the first remote location, and
   automatically initiating a notification to the first remote location and to a second remote location, one of the first and second remote locations being a portable location.

9. The method of claim 8 wherein the step of pre-setting the pre-determined machine conditions includes the step of presetting a jam condition.

10. The method of claim 8 wherein the step of pre-setting the pre-determined machine conditions includes the step of pre-setting a job completion condition.

11. An image processing apparatus having image processing components for forming images on a medium comprising a controller for directing the operation of the image processing components, a machine monitoring element to sense predetermined machine conditions, a communication device for communication with a plurality of remote stations, means for pre-setting the predetermined machine conditions from a first remote location, means for monitoring the operation of the image processing apparatus, means for detecting a machine condition preset from the first remote location, and means for automatically initiating a notification to the first remote location and to a second remote location, one of the first and second remote locations being a portable location.

12. The image processing apparatus of claim 11 wherein one of the first remote and second remote locations is an electronic workstation with screen display.

13. In an image processing apparatus having image processing components for forming images on a medium, a controller for directing the operation of the image processing components including a machine monitoring element to sense machine job completion and machine jam conditions, the image processing apparatus adapted for communication with a plurality of remote stations including an electronic pager and an electronic workstation with display screen, the method of automatic notification to the remote stations in response to machine job completion and machine jam conditions detected by the machine monitoring element comprising the steps of:

pre-setting the predetermined machine conditions from the electronic workstation, monitoring the operation of the image processing apparatus, detecting machine job completion and machine jam conditions by the machine monitoring element, and automatically initiating a notification to the pager in response to the detecting of either machine job completion or machine jam conditions.

14. An imaging machine comprising a machine monitoring element for detecting machine conditions, means responsive to the detected machine conditions for selectively notifying remote devices, means for selectively changing the machine conditions for notification to the remote devices, the means for selectively notifying remote devices including means for automatically initiating a notification to the remote locations on a priority basis including means for notification to a first remote station in response to a first machine condition and means for notification to a second remote station in response to a second machine condition detected by the machine monitoring element.

15. In an image processing machine having image processing components for forming images on a medium including a machine monitoring element to sense predetermined machine condition and a controller for directing the operation of the image processing components, the machine adapted for communication with a plurality of remote stations, a method of presetting the controller for automatic notification to a selected remote station in response to the pre-determined machine conditions detected by the machine monitoring element comprising the steps of:

accessing an interface at one of the processing machine and remote stations, the interface including a plurality of pre-setting options, selecting a first pre-setting option at the interface, pre-setting the predetermined machine conditions in response to said first pre-setting option, selecting a second pre-setting option at the interface, pre-setting the predetermined machine conditions in response to said second pre-setting option, monitoring the operation of the image processing apparatus, detecting one of the first and second pre-setting options, and responsive to the detecting automatically initiating a notification to one of the plurality of remote stations.

16. The method of claim 15 including the step of accessing the interface at a remote station and including a screen for displaying the pre-setting options.

17. The method of claim 15 including the step of accessing the interface at the image processing machine and including a screen for displaying the pre-setting options.

18. The method of claim 15 wherein the step of automatically initiating a notification to one of the plurality of remote stations includes the steps of automatically initiating a notification to a first remote station in response to the first pre-setting option and automatically initiating a notification to a second remote station in response to the second pre-setting option.

19. The method of claim 15 wherein the step of selecting a first pre-setting option at the interface includes the step of selecting the option in a window display at the interface.

20. The method of claim 19 including the step of scrolling options in the window display.

21. In an image processing machine having image processing components for forming images on a medium including a machine monitoring element to sense predetermined machine condition and a controller for directing the operation of the image processing components, the machine adapted for communication with a plurality of remote stations, a method of presetting the controller for automatic notification to a selected remote station in response to the pre-determined machine conditions detected by the machine monitoring element comprising the steps of:

accessing an interface at one of the remote stations, the interface including a display with a plurality of pre-setting options, selecting a job status option at the interface, pre-setting the predetermined machine conditions in response to said job status option, selecting a machine status option at the interface, pre-setting the predetermined machine conditions in response to the machine status option, monitoring the operation of the image processing apparatus, detecting one of the first and second options, and responsive to the detecting automatically initiating a notification to one of the plurality of remote stations for the job status option and initiating a notification to another of the plurality of remote stations for the machine status option.

22. A communication network having a plurality of remote devices and a user interface, one of the devices being an image processing machine having image processing components for forming images on a medium and a controller for directing the operation of the image processing components including a machine monitoring element to sense predetermined machine conditions, and means for automatic notification to a selected one of the plurality of remote devices in response to the predetermined machine conditions detected by the machine monitoring element comprising selecting means for pre-setting the predetermined machine conditions from the user interface, means for monitoring the operation of the image processing apparatus, means for detecting a machine condition preset from the user interface, and means for automatically initiating a notification to a first remote device in response to a first machine condition and to a second remote device in response to a second machine condition, one of the first and second remote devices being a portable device.

23. The communication network of claim 22 including means to alter the pre-set predetermined machine conditions.

* * * * *